US 6,700,295 B2

(12) United States Patent
Kanno et al.

(10) Patent No.: US 6,700,295 B2
(45) Date of Patent: Mar. 2, 2004

(54) ROTOR OF ELECTRIC MOTOR AND MANUFACTURING METHOD THEREOF (75) Inventors: Kazunobu Kanno, Toyohashi (JP); Shinsuke Muroi, Hamamatsu (JP)

(73) Assignee: ASMO Co., Ltd., Shizuoka-ken (JP)

( * ) Notice: Subject to any disclaimer, the term of this patent is extended or adjusted under 35 U.S.C. 154(b) by 33 days.

(21) Appl. No.: 10/318,347

(22) Filed: Dec. 11, 2002

(65) Prior Publication Data

US 2003/0127937 A1 Jul. 10, 2003

(30) Foreign Application Priority Data

Dec. 11, 2001 (JP) .................................... 2001-377742
Nov. 19, 2002 (JP) .................................... 2002-334933

(51) Int. Cl.$^7$ .......................... H02K 1/22; H02K 15/02
(52) U.S. Cl. ...................... 310/261; 310/42; 310/217; 29/598
(58) Field of Search ...................... 310/42, 216, 217, 310/259, 261; 29/598

(56) References Cited

U.S. PATENT DOCUMENTS 4,365,180 A * 12/1982 Licata et al. ................ 310/216
6,169,350 B1 * 1/2001 Yang ........................... 310/216

FOREIGN PATENT DOCUMENTS

| JP | 60-170431 | 9/1985 | ............ H02K/1/28 |
| JP | 2000-152528 | 5/2000 | ............ H02K/1/18 |
| JP | 2000-201458 | 7/2000 | .......... H02K/15/02 |
| JP | 2001-069705 | 3/2001 | ............ H02K/1/30 |

* cited by examiner

Primary Examiner—Burton Mullins
(74) Attorney, Agent, or Firm—Sheridan Ross PC

(57) ABSTRACT

A rotor core includes a plurality of first core sheets and a plurality of second core sheets. The first core sheets and the second core sheets are laminated in the axial direction of the rotor core. Each first core sheet includes a plurality of first teeth laid out in a ring form on a same plane. Each second core sheet includes a plurality of second teeth laid out in a ring form on a same plane. Each first tooth is placed over the associated second tooth in the axial direction of the rotor core. Each tooth has a winding portion extending in the radial direction of the rotor core and an arm portion integrally provided at an outer end of the winding portion in the radial direction of the rotor core and extending in the peripheral direction of the rotor core. Each arm portion has a coupling portion at one end. Each first tooth is coupled to that one of the second teeth which is stacked on another first tooth adjoining in the peripheral direction of the rotor core by coupling of their coupling portions. A portion of each arm portion, which excludes the associated coupling portion, is located further apart from the axis of the rotor core than the associated coupling portion.

13 Claims, 7 Drawing Sheets

ROTOR OF ELECTRIC MOTOR AND MANUFACTURING METHOD THEREOF

BACKGROUND OF THE INVENTION

The present invention relates to a rotor of an electric motor and a manufacturing method thereof.

Figure 8:
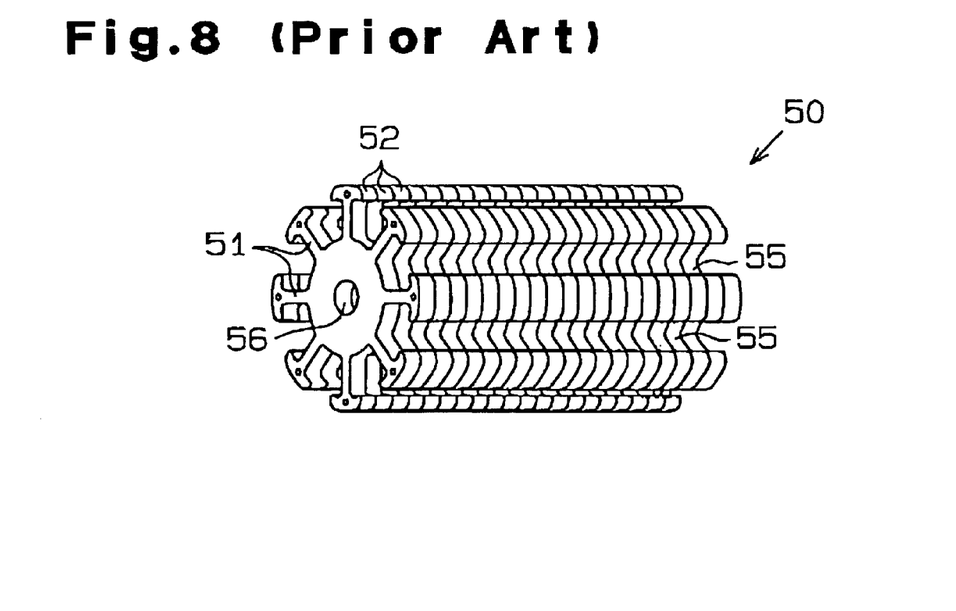
FIG. 8 is a perspective view showing a rotor core according to prior art.
Figure 9:
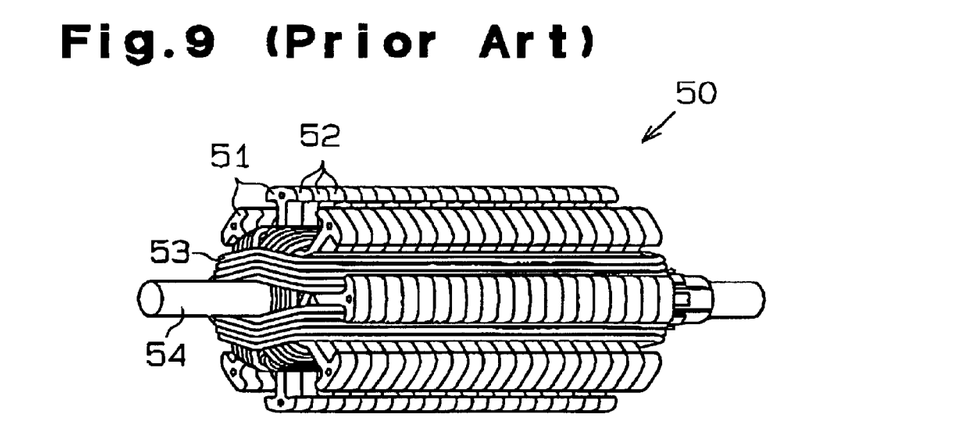
FIG. 9 is a perspective view showing a winding wound on the rotor core shown in FIG. 8.

FIGS. 8 and 9 show a conventional rotor core 50. As shown in FIGS. 8 and 9, the rotor core 50 has a plurality of core sheets 52 laminated one on another. Each core sheet 52 has a plurality of teeth 51 extending radially. A winding 53 is wound on the rotor core 50 by distributed winding after a shaft 54 is inserted into a center hole 56. As a result, the winding 53 is laid out in slots 55 each formed between the teeth 51 adjoining in the peripheral direction. In a case where the winding 53 by distributed winding, however, it is difficult to increase the space factor of the winding in the slots 55.

SUMMARY OF THE INVENTION

Accordingly, it is a primary objective of the present invention to provide a rotor of an electric motor which can easily increase the space factor of the winding and a manufacturing method thereof.

To achieve the object, the present invention provides a rotor of an electric motor which is constructed in the following manner. The rotor includes a plurality of first core sheets and a plurality of second core sheets. Each first core sheet includes a plurality of first teeth laid out in a ring form on a first plane. Each first tooth has a first winding portion extending in the radial direction of the rotor and a first arm portion integrally provided at an outer end of the first winding portion in the radial direction of the rotor and extending in the peripheral direction of the rotor. Each first arm portion has a first coupling portion at one end. Each second core sheet includes a plurality of second teeth laid out in a ring form on a second plane. Each second tooth has a second winding portion extending in the radial direction of the rotor and a second arm portion integrally provided at an outer end of the second winding portion in the radial direction of the rotor and extending in the peripheral direction of the rotor. Each second arm portion has a second coupling portion at one end. The first core sheets and the second core sheets are stacked in the axial direction of the rotor. Each first tooth is stacked on an associated one of the second teeth in the axial direction of the rotor. Each first tooth is coupled to that one of the second teeth which is stacked on another one of the first teeth adjoining in the peripheral direction of the rotor by coupling of the first and second coupling portions. A remaining portion of each arm portion, which excludes the associated coupling portion, is located further apart from the axis of the rotor than the associated coupling portion.

The present invention further provides a method of manufacturing a rotor of an electric motor, which comprises the steps of forming a plurality of first teeth and a plurality of second teeth by punching a metal plate, each tooth having a winding portion extending in one direction and an arm portion which is integrally provided at a distal end of the winding portion, said arm portion extending in a direction nearly perpendicular to the winding portion and having a coupling portion at one end, a remaining portion of each arm portion which excludes the associated coupling portion being located further apart from a proximal end of the associated winding portion than the associated coupling portion; forming a plurality of laminated bodies by stacking the first teeth and the second teeth in such a way that the coupling portions of the first teeth and the coupling portions of the second teeth in each laminated body face in opposite directions; forming a coupled body comprised of a plurality of laminated bodies by coupling the coupling portions of the first teeth in one of adjoining two laminated bodies to the coupling portions of the second teeth in the other one of the adjoining two laminated bodies in a rotatable manner, the laminated bodies being laid out in a line in such a way that the winding portions in each laminated body become nearly parallel to the winding portions in another laminated body; winding a winding on the winding 10 portions in each laminated body; and rotating adjoining two laminated bodies in such a way that the coupled body forms a ring-like shape and the winding portions are arranged radially.

Other aspects and advantages of the invention will become apparent from the following description, taken in conjunction with the accompanying drawings, illustrating by way of example the principles of the invention.

BRIEF DESCRIPTION OF THE DRAWINGS

The features of the invention which are believed to be novel will become apparent particularly in the scope of the appended claims. The invention, together with objects and advantages thereof, may best be understood by reference to the following description of the presently preferred embodiments together with the accompanying drawings.

DETAILED DESCRIPTION OF THE PREFERRED EMBODIMENTS

The first embodiment of the present invention will be described below referring to FIGS. 1 through 6.

Figure 1:
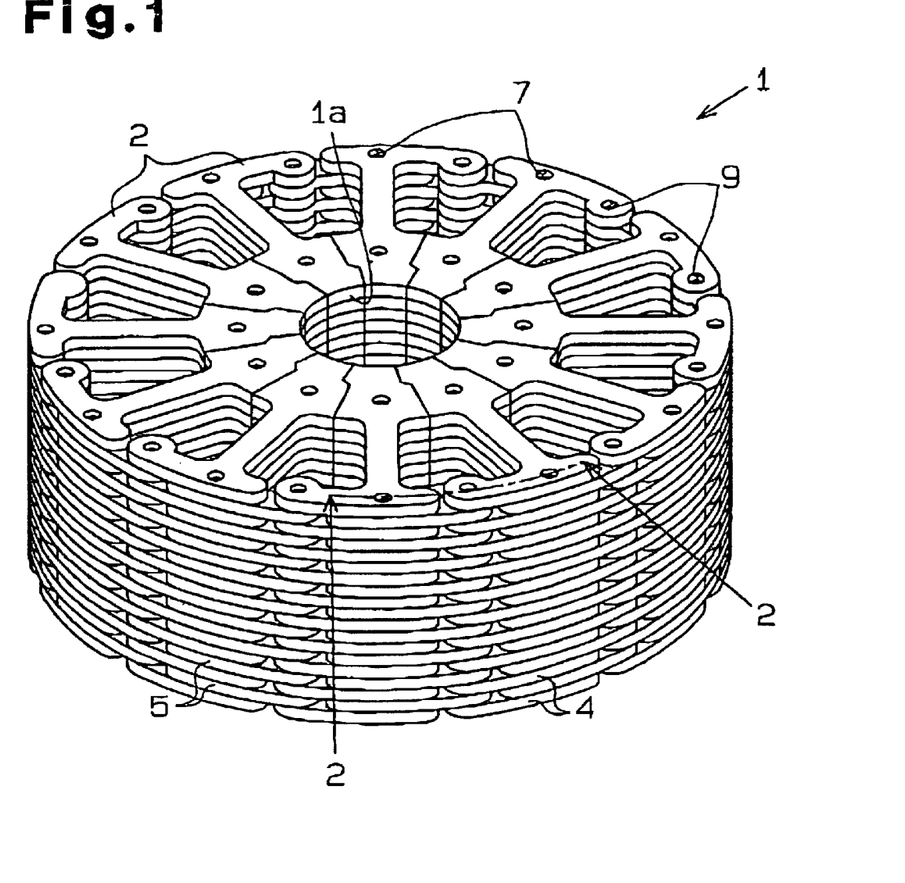
FIG. 1 is a perspective view of a rotor core according to a first embodiment of the present invention.
Figure 2:
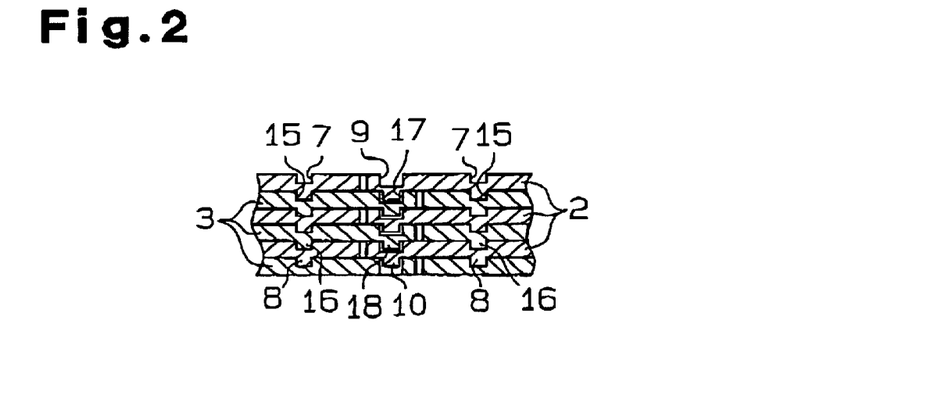
FIG. 2 is a cross-sectional view taken along the line 2—2 in FIG. 1.

FIGS. 1 and 2 show a rotor core 1. The rotor core 1 has plural (ten in the embodiment) first core sheets 4 having plural (twelve in the embodiment) first teeth 2 laid out in an approximately disc form and plural (nine in the embodiment) second core sheets 5 having plural (twelve in the embodiment) second teeth 3 laid out in an approximately disc form. The rotor core 1 is formed into an approximately columnar shape by alternately laminating the first core sheets 4 and the second core sheets 5 in the axial direction of the rotor core 1. In the rotor core 1, each first tooth 2 is stacked on the associated second tooth 3 in the axial direction of the rotor core 1. A circular hole 1a where a shaft (not shown) is to be inserted is formed in the center of the rotor core 1.

Figure 3A:
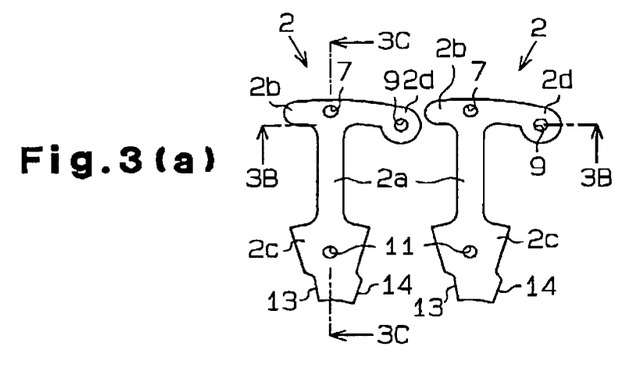
FIG. 3(a) is a plan view of first teeth which the rotor core shown in FIG. 1 has.
Figure 3B:
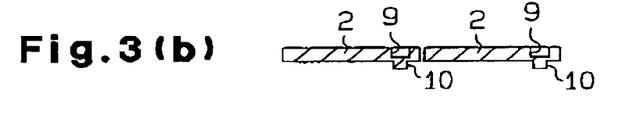
FIG. 3(b) is a cross-sectional view taken along the line 3B—3B in FIG. 3(a)
Figure 3C:
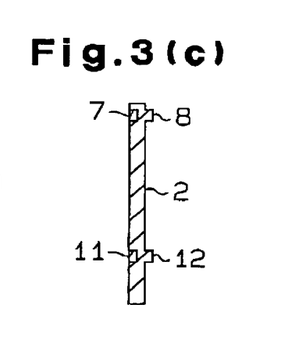
FIG. 3(c) is a cross-sectional view taken along the line 3C—3C in FIG. 3(a)

FIGS. 3(a) through 3(c) illustrate the first teeth 2. To avoid making the drawings complicated, some of reference numbers of the members of the first tooth 2 are omitted in the diagrams other than FIGS. 3(a) through 3(c).

Each first tooth 2 has a first winding portion 2a, a first arm portion 2b and a first fixing portion 2c. Each first winding portion 2a extends in the radial direction of the rotor core 1. Each first arm portion 2b has both ends and is integrally provided at the distal end of the associated first winding portion 2a (an outer end in the radial direction of the rotor core 1 or the upper end in FIG. 3(a)). Each first arm portion 2b extends in the peripheral direction of the rotor core 1. In other words, each first arm portion 2b extends in a direction approximately perpendicular to the associated first winding portion 2a. Each first fixing portion 2c is integrally provided at the proximal end of the associated first winding portion 2a (an inner end in the radial direction of the rotor core 1 or the lower end in FIG. 3(a)). In the first core sheet 4, the individual first teeth 2 are laid out in a ring form on the same plane in such a way that one end of the first arm portion 2b of each first tooth 2 adjoins the other end of the first arm portion 2b of another first tooth 2 in the peripheral direction of the rotor core 1.

A first fitting recess 7 is formed in nearly the center portion of the top surface of each first arm portion 2b and a first fitting projection 8 is formed in,nearly the center portion of the back surface of the first arm portion 2b. In other words, the first fitting recess 7 and the first fitting projection 8 are provided in those portions of each first tooth 2 which are located further away from the axis of the rotor core 1 than the first winding portion 2a, i.e., those portions of each first tooth 2 which are located off the first winding portion 2a. The first fitting recess 7 and the first fitting projection 8 provided on each first tooth 2 are positioned coaxially.

Each first arm portion 2b has a first coupling portion 2d at its one end (the right-hand end in FIG. 3(a)). With regard to the radial direction of the rotor core 1, the size of a remaining portion of each first arm portion 2b which excludes the first coupling portion 2d is smaller than the size of the associated first coupling portion 2d. The remaining portion of each first arm portion 2b is located further apart from the proximal end of the associated first winding portion 2a or the axis of the rotor core 1 than the associated first coupling portion 2d. In other words, each first coupling portion 2d is positioned closer to the axis of the rotor core 1 than the portion of each first arm portion 2b which excludes the associated first coupling portion 2d.

A first rotary recess 9 is formed in nearly the center portion of the top surface of each first coupling portion 2d and a first rotary projection 10 is formed in nearly the center portion of the back surface of the first coupling portion 2d. The diameter of the first rotary recess 9 is slightly greater than the diameter of the first rotary projection 10. The first rotary recess 9 and the first rotary projection 10 provided on each first tooth 2 are positioned coaxially.

Each first fixing portion 2c becomes narrower toward the distal end (the center of the rotor core 1). The distal end face of each first fixing portion 2c is formed in a concave shape. A first fitting recess 11 is formed in nearly the center portion of the top surface of each first fixing portion 2c and a first fitting projection 12 is formed in nearly the center portion of the back surface of the first fixing portion 2c. In other words, the first fitting recess 11 and the first fitting projection 12 are provided in those portions of each first tooth 2 which are located closer to the axis of the rotor core 1 than the first winding portion 2a, i.e., those portions of each first tooth 2 which are located off the first winding portion 2a. The first fitting recess 11 and the first fitting projection 12 provided on each first tooth 2 are positioned coaxially.

An indentation 13 is formed on one side of each first fixing portion 2c and a lug 14 is formed on the other side of the first fixing portion 2c. In the first core sheet 4, the indentation 13 of each first tooth 2 is engaged with the lug 14 of another first tooth 2 adjoining the former first tooth 2 in the peripheral direction of the rotor core 1. Therefore, the relative movement of the first teeth 2 adjoining each other in the peripheral direction of the rotor core 1 in the radial direction of the rotor core 1 is restricted. According to the embodiment, the indentation 13 and the lug 14 constitute the restriction portion of the first tooth 2.

Figure 3D:
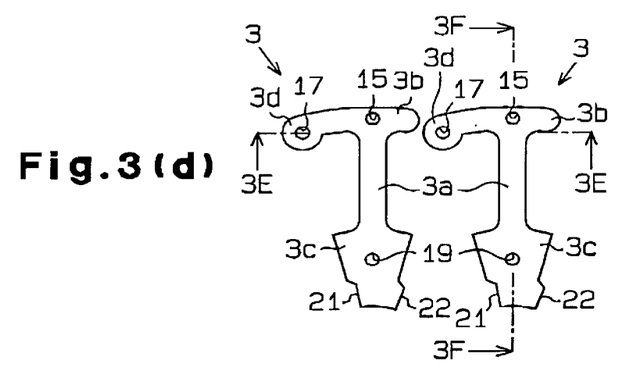
FIG. 3(d) is a plan view of second teeth which the rotor core shown in FIG. 1 has.
Figure 3E:
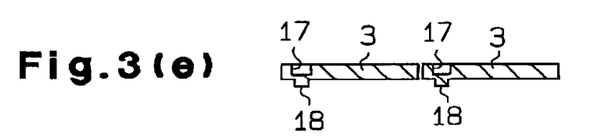
FIG. 3(e) is a cross-sectional view taken along the line 3E—3E in FIG. 3(d)
Figure 3F:
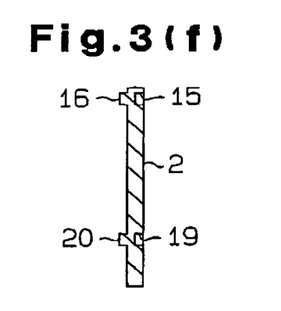
FIG. 3(f) is a cross-sectional view taken along the line 3F—3F in FIG. 3(d)

FIGS. 3(d) through 3(f) illustrate the second tooth 3. To avoid making the drawings complicated, some of reference numbers of the members of the second tooth 3 are omitted in the diagrams other than FIGS. 3(d) through 3(f).

Each second tooth 3 has a second winding portion 3a, a second arm portion 3b and a second fixing portion 3c. Each second winding portion 3a extends in the radial direction of the rotor core 1. Each second arm portion 3b has both ends and is integrally provided at the distal end of the associated second winding portion 3a (an outer end in the radial direction of the rotor core 1 or the upper end in FIG. 3(d)). Each second arm portion 3b extends in the peripheral direction of the rotor core 1. In other words, each second arm portion 3b extends in a direction approximately perpendicular to the associated second winding portion 3a. Each second fixing portion 3c is integrally provided at the proximal end of the associated second winding portion 3a (an inner end in the radial direction of the rotor core 1 or the lower end in FIG. 3(d)). In the second core sheet 5, the individual second teeth 3 are laid out in a ring form on the same plane in such a way that one end of the second arm portion 3b of each second tooth 3 adjoins the other end of the second arm portion 3b of another second tooth 3 in the peripheral direction of the rotor core 1.

A second fitting recess 15 is formed in nearly the center portion of the top surface of each second arm portion 3b and a second fitting projection 16 is formed in nearly the center portion of the back surface of the second arm portion 3b. In other words, the second fitting recess 15 and the second fitting projection 16 are provided in those portions of each second tooth 3 which are located further away from the axis of the rotor core 1 than the second winding portion 3a, i.e., those portions of each second tooth 3 which are located off the second winding portion 3a. The second fitting recess 15 and the second fitting projection 16 provided on each second tooth 3 are positioned coaxially. In the rotor core 1, the first fitting projection 8 of each first tooth 2 is fitted in the second fitting recess 15 of the second tooth 3 which is stacked on that first tooth 2, and the first fitting recess 7 of each first tooth 2 is fitted over the second fitting projection 16 of the second tooth 3 which is stacked on that first tooth 2.

Each second arm portion 3b has a second coupling portion 3d at its one end (the left-hand end in FIG. 3(d)). The size of a remaining portion of each second arm portion 3b which excludes the second coupling portion 3d is smaller than the size of the associated second coupling portion 3d. The remaining portion of each second arm portion 3b is located further apart from the proximal end of the associated second winding portion 3a or the axis of the rotor core I than the associated second coupling portion 3d. In other words, each second coupling portion 3d is positioned closer to the axis of the rotor core 1 as compared with the portion of each second arm portion 3b which excludes the associated second coupling portion 3d.

A second rotary recess 17 is formed in nearly the center portion of the top surface of each second coupling portion 3d and a second rotary projection 18 is formed in nearly the center portion of the back surface of the second coupling portion 3d. The diameter of the second rotary recess 17 is slightly greater than the diameter of the second rotary projection 18. The second rotary recess 17 and the second rotary projection 18 provided on each second tooth 3 are positioned coaxially. In the rotor core 1, the first rotary projection 10 of each first tooth 2 is rotatably engaged with the second rotary recess 17 of the second tooth 3 which is staked on another first tooth 2 adjoining the former first tooth 2 in the peripheral direction of the rotor core 1, and the first rotary recess 9 of each first tooth 2 is rotatably engaged with the second rotary projection 18 of the second tooth 3 which is stacked on another first tooth 2 adjoining the former first tooth 2 in the peripheral direction of the rotor core 1.

Each second fixing portion 3c becomes narrower toward the distal end (the center of the rotor core 1). The distal end face of each second fixing portion 3c is formed in a concave shape. A second fitting recess 19 is formed in nearly the center portion of the top surface of each second fixing portion 3c and a second fitting projection 20 is formed in nearly the center portion of the back surface of each second fixing portion 3c. In other words, the second fitting recess 19 and the second fitting projection 20 are provided in those portions of each second tooth 3 which are located closer to the axis of the rotor core I than the second winding portion 3a, i.e., those portions of each second tooth 3 which are located off the second winding portion 3a. The second fitting recess 19 and the second fitting projection 20 provided on each second tooth 3 are positioned coaxially. In the rotor core 1, the first fitting projection 12 of each first tooth 2 is fitted in the second fitting recess 19 of the second tooth 3 which is stacked on that first tooth 2, and the first fitting recess 11 of each first tooth 2 is fitted over the second fitting projection 20 of the second tooth 3 which is stacked on that first tooth 2.

An indentation 21 is formed on one side of each second fixing portion 3c and a lug 22 is formed on the other side of the second fixing portion 3c. In the second core sheet 5, the indentation 21 of each second tooth 3 is engaged with the lug 22 of another second tooth 3 adjoining the former second tooth 3 in the peripheral direction of the rotor core 1. Therefore, the relative movement of the second teeth 3 adjoining each other in the peripheral direction of the rotor core 1 in the radial direction of the rotor core 1 is restricted. According to the embodiment, the indentation 21 and the lug 22 constitute the restriction portion of the second tooth 3.

A method of manufacturing the rotor core 1 will be discussed below referring to FIG. 4(a) to FIG. 6.

Figure 4A:
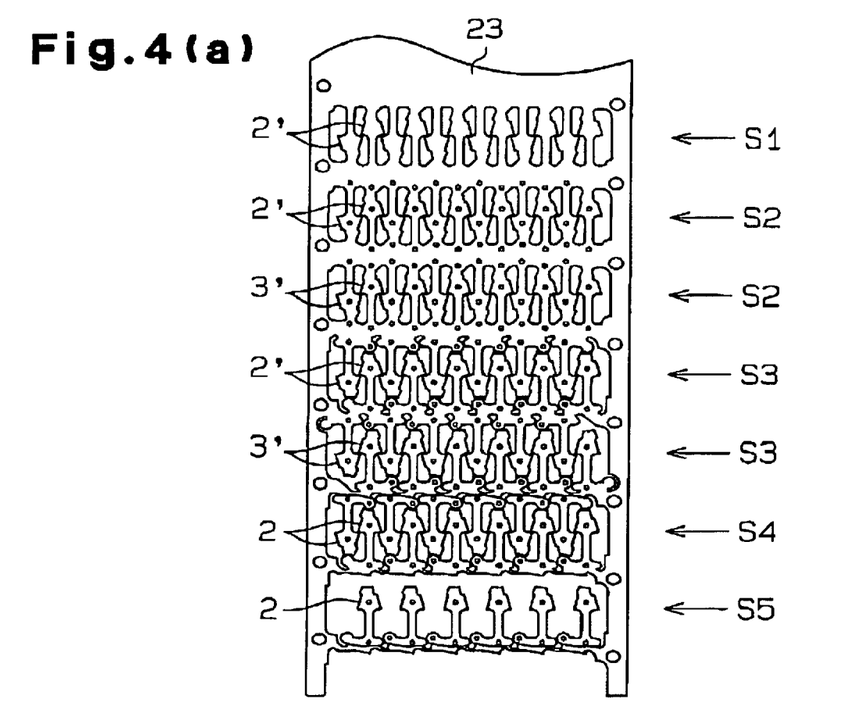
FIG. 4(a) is a conceptual diagram of a step of forming the first teeth shown in FIG. 3(a) and the second teeth shown in FIG. 3(d)

FIG. 4(a) shows a step of forming the first teeth 2 and the second teeth 3. In forming the first teeth 2 and the second teeth 3, as shown in FIG. 4(a), first, unnecessary portions of a metal flat plate 23 is punched out by an unillustrated press machine to form a first trim 2' equivalent to the first tooth 2 and a second trim 3' equivalent to the second tooth 3 (step S1). In this trimming step, a plurality of first trim rows including plural (twelve in the embodiment) first trims 2' and a plurality of second trim rows including plural (twelve in the embodiment) second trims 3' are formed on the flat plate 23. The adjoining first trims 2' in each first trim row face in the alternate directions, and the adjoining second trims 3' in each second trim row face in the alternate directions. The first trim rows and the second trim rows are arranged alternately in the up and down direction of the flat plate 23. When step S1 ends, the fabrication process goes to step S2.

In step S2, the press machine forms the first fitting recesses 7 and 11, the first fitting projections 8 and 12, the first rotary recesses 9, and the first rotary projection 10 on each first trim 2' and forms the second fitting recesses 15 and 19, the second fitting projections 16 and 20, the second rotary recesses 17, and the second rotary projection 18 on each second trim 3'. It is to be noted, however, that the first rotary recess 9 and the first rotary projection 10 are not formed on the first trim 2' that is located at one end of each first trim row and the second rotary recess 17 and the second rotary projection 18 are not formed on the second trim 3' that is located at one end of each second trim row. When step S2 ends, the fabrication process goes to step S3.

In step S3, the press machine forms the first arm portion 2b and the first coupling portion 2d on each first trim 2' and forms the second arm portion 3b and the second coupling portion 3d on each second trim 3'. When step S3 ends, the fabrication process proceeds to step S4 and step S5.

In step S4 and step S5, the first teeth 2 and the second teeth 3 are punched out by the press machine. The punched-out first teeth 2 and second teeth 3 are alternately stacked one on another to form plural (twelve in the embodiment) laminated bodies 26a (see FIG. 4(b)). At the same time, the first teeth 2 and the second teeth 3 are laid out in such a way that one end of the first arm portion 2b of each first tooth 2 adjoins the other end of the first arm portion 2b of another first tooth 2 and one end of the second arm portion 3b of each second tooth 3 adjoins the other end of the second arm portion 3b of another second tooth 3. Each first tooth 2 is rotatably coupled to the second tooth 3 that is stacked on another first tooth 2 which adjoins the former first tooth 2 by coupling of the first coupling portion 2d and the second coupling portion 3d. In other words, each second tooth 3 is rotatably coupled to the first tooth 2 that is stacked on another second tooth 3 which adjoins the former second tooth 3 by coupling of the first coupling portion 2d and the second coupling portion 3d. This yields a coupled body 26 which comprises the plural laminated bodies 26a.

Figure 4B:
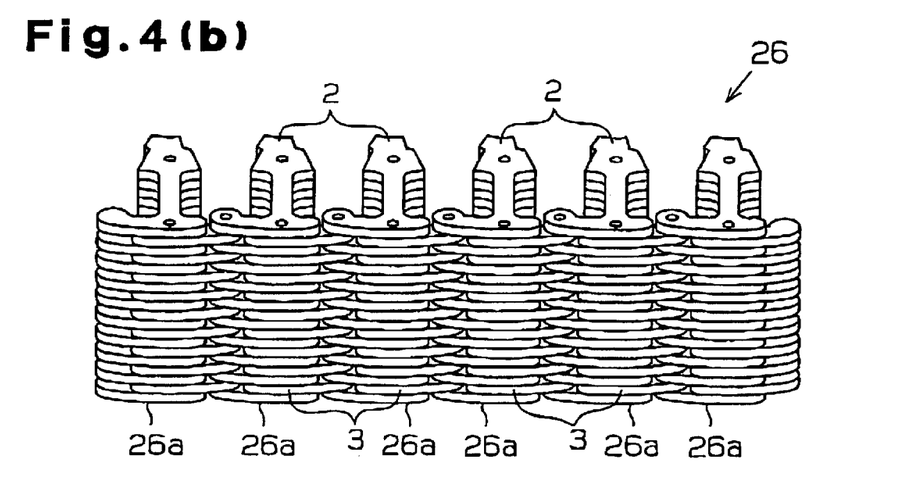
FIG. 4(b) is a perspective view showing a coupled body.

The first coupling portion 2d extends from one side of each laminated body 26a and the second coupling portion 3d extends from the other side. In other words, the first coupling portion 2d and the second coupling portion 3d in each laminated body 26a face in the opposite directions. In the formation of the coupled body 26, therefore, the first coupling portion 2d of one of adjoining two laminated bodies 26a is rotatably coupled to the second coupling portion 3d of the other laminated body 26a.

In each laminated body 26a, the first fitting projection 8 of each first tooth 2 is fitted in the second fitting recess 15 of the second tooth 3 which is stacked on that first tooth 2, and the first fitting recess 7 of each first tooth 2 is fitted over the second fitting projection 16 of the second tooth 3 which is stacked on that first tooth 2. The first fitting projection 12 of each first tooth 2 is fitted in the second fitting recess 19 of the second tooth 3 which is stacked on that first tooth 2, and the first fitting recess 11 of each first tooth 2 is fitted over the second fitting projection 20 of the second tooth 3 which is stacked on that first tooth 2. Further, first rotary projection 10 of each first tooth 2 is engaged in a rotatable manner with the second rotary recess 17 of the second tooth 3 which is stacked on another first tooth 2 adjoining the former first tooth 2 in the peripheral direction of the rotor core 1, and first rotary recess 9 of each first tooth 2 is engaged in a rotatable manner with the second rotary projection 18 of the second tooth 3 which is stacked on another first tooth 2 adjoining the former first tooth 2 in the peripheral direction of the rotor core 1.

Figure 5A:
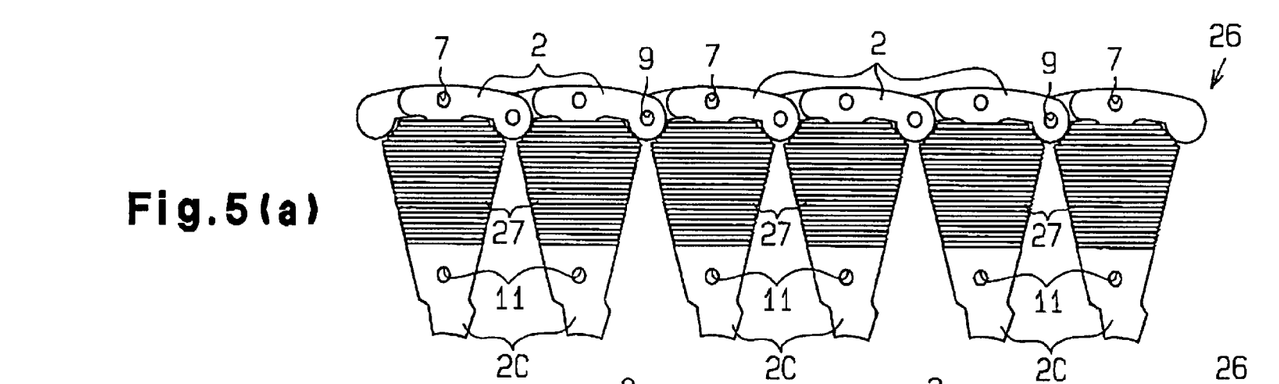
FIG. 5(a) is a plan view showing a winding wound on the coupled body shown in FIG. 4(b)
Figure 5B:
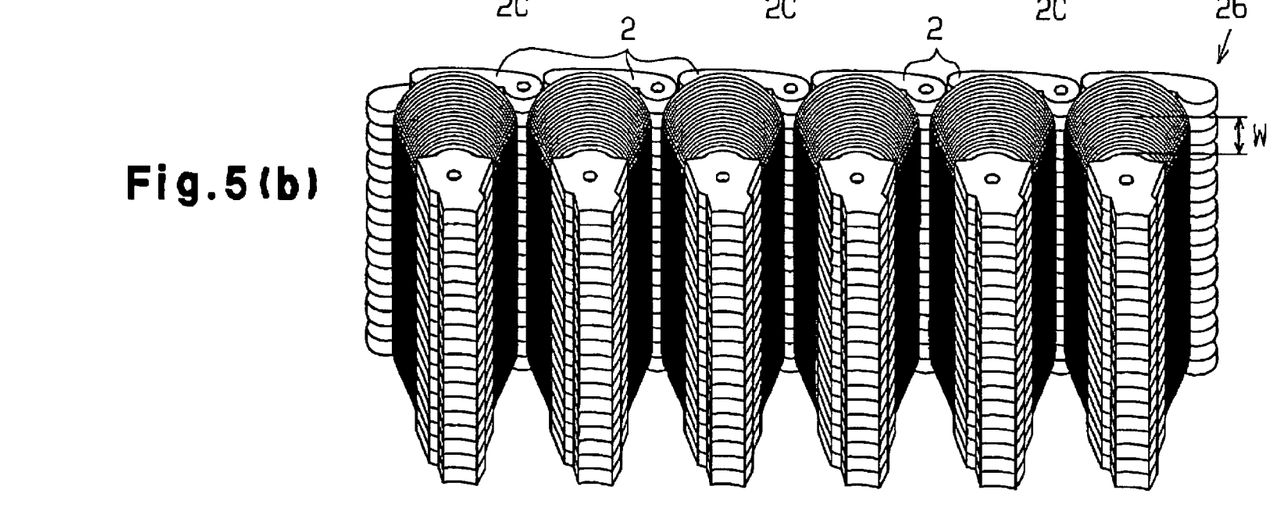
FIG. 5(b) is a perspective view showing the winding wound on the coupled body shown in FIG. 4(b)

FIGS. 5(a) and 5(b) show a winding 27 wound on the coupled body 26. Prior to the winding of the winding 27, the laminated bodies 26a of the coupled body 26 are arranged in a line in such a way that the winding portions 2a and 3a of each laminated body 26a become approximately parallel to the winding portions 2a and 3a of another laminated body 26a. The winding 27 is wound in a concentrated winding manner in the winding portions 2a and 3a of each of the laminated bodies 26a of the coupled body 26, which are laid out in a line.

The coupled body 26 with the winding 27 wound thereon takes the ring form as adjoining two laminated bodies 26a are turned relative to each other. At this time, the first winding portions 2a and the second winding portions 3a are arranged radially.

Figure 6:
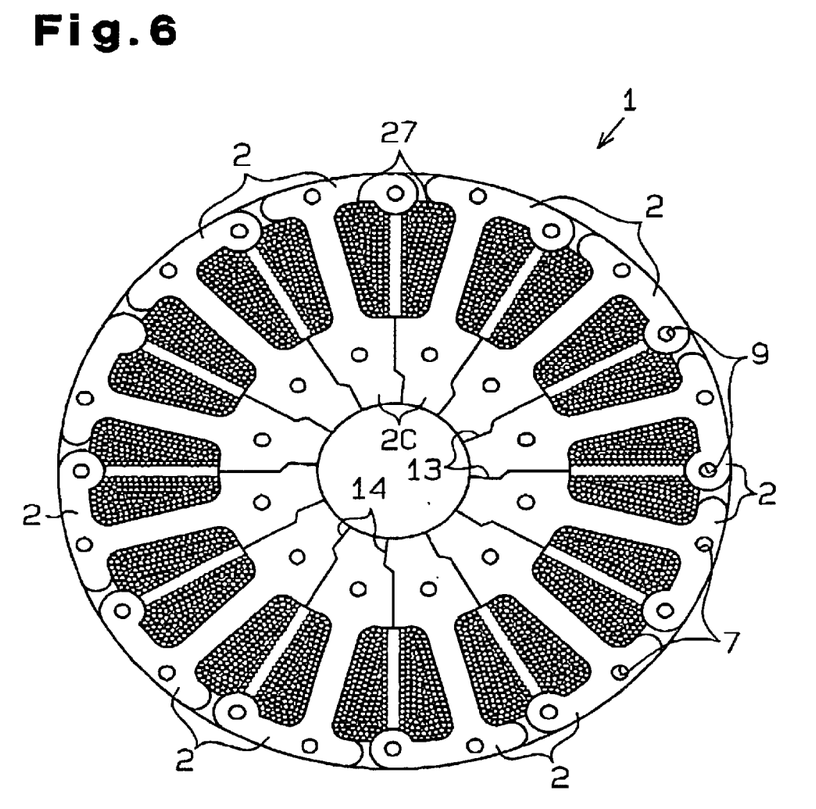
FIG. 6 is a cross-sectional view of the rotor core on which the winding is wound.

The connected portion of one end and the other end of the ring-shaped coupled body 26 is secured by laser welding, thereby yielding the rotor core 1 which has the winding 27 wound as shown in FIG. 6. Further, the engaged portion of the indentation 13 of one first tooth 2 with the lug 14 of another first tooth 2 adjoining the former first tooth 2 in the peripheral direction of the rotor core 1 is secured by laser welding, and the engaged portion of the indentation 21 of one second tooth 3 with the lug 22 of another second tooth 3 adjoining the former second tooth 3 in the peripheral direction of the rotor core 1 is secured by laser welding.

The first embodiment has the following advantages.

The winding 27 is wound after the laminated bodies 26a of the coupled body 26 are arranged in a line in such a way that the winding portions 2a and 3a of each laminated body 26a become nearly parallel to the winding portions 2a and 3a of another laminated body 26a. At the time of winding the winding 27, therefore, it is possible to provide a sufficient gap between the winding portions 2a and 3a of adjoining laminated bodies 26a. Therefore, the winding 27 can be wound easily, making it possible to shorten the time needed to wind the winding 27 and to ensure orderly winding of the winding 27. Because it is unnecessary to provide the outer edge portion of the rotor core 1 with a clearance for insertion of the winding 27, it is possible to suppress the generation of cogging torque.

As the winding 27 is wound in an orderly fashion, the space factor of the winding 27 can be increased. It is also possible to reduce the amount W of the winding 27 (see FIG. 5(b)) which protrudes from the rotor core 1, thus ensuring size reduction of the electric motor. Further, it is possible to prevent an increase in the winding resistance which would otherwise be originated if the winding 27 becomes unnecessarily long.

The engagement of the indentation 13 with the lug 14 restricts the relative movement in the radial direction of the rotor core 1, of the first teeth 2 adjoining each other in the peripheral direction of the rotor core 1. The engagement of the indentation 21 with the lug 22 restricts the relative movement in the radial direction of the rotor core 1, of the second teeth 3 adjoining each other in the peripheral direction of the rotor core 1. At the time the shaft is inserted in the hole 1a of the rotor core 1, therefore, it is less likely for the teeth 2 and 3 to imprudently move in the radial direction of the rotor core 1.

In the step of forming the first teeth 2 and the second teeth 3, the first trim rows and the second trim rows are arranged alternately in the up and down direction of the flat plate 23. It is therefore easy to alternately laminate the first teeth 2 and the second teeth 3 at the same time as they are punched out. This can shorten the manufacturing time.

The adjoining first trims 2' in each first trim row face in the alternate directions and the adjoining second trims 3' in each second trim row face in the alternate directions. It is therefore possible to efficiently produce the teeth 2 and 3 from the flat plate 23, thus ensuring an improved yield.

The first coupling portion 2d and the second coupling portion 3d in each laminated body 26a face in the opposite directions. A sufficient rigidity can be secured for the first coupling portion 2d and the second coupling portion 3d in each laminated body 26a, thus making it possible to suppress damaging of the coupling portions 2d and 3d.

The first fitting recesses 7 and 11 and the first fitting projections 8 and 12 are provided at those portions of each first tooth 2 which are located off the first winding portion 2a, and the second fitting recesses 15 and 19 and the second fitting projections 16 and 20 are provided in those portions of each second tooth 3 which are located off the second winding portion 3a. This makes it possible to prevent the flow of magnetism from being disturbed by the fitting recesses 7, 11, 15 and 19 and the fitting projections 8, 12, 16 and 20.

The first fitting recess 7 and the first fitting projection 8 are formed in approximately the center portion of the associated first arm portion 2b, and the first fitting recess 11 and the first fitting projection 12 are formed in approximately the center portion of the associated first fixing portion 2c. The second fitting recess 15 and the second fitting projection 16 are formed in approximately the center portion of the associated second arm portion 3b, and the second fitting recess 19 and the second fitting projection 20 are formed in approximately the center portion of the associated second fixing portion 3c. It is therefore possible to stably stack the first teeth 2 and the second teeth 3 one on the other.

The remaining portion of each first arm portion 2b is located further apart from the axis of the rotor core 1 than the associated first coupling portion 2d, and the remaining portion of each second arm portion 3b is located further apart from the axis of the rotor core 1 than the associated second coupling portion 3d. This makes it possible to secure a large windable portion of the winding 27 in the radial direction of the rotor core 1. It is thus possible to wind a greater amount of the winding 27 on the winding portions 2a and 3a of each laminated body 26a.

The second embodiment of the present invention will be discussed below referring to FIGS. 7(a) to 7(e). The second embodiment has the same structure as the first embodiment, except that the shapes of the teeth 2 and 3 of the rotor core 1 of the first embodiment described above are partly modified. To avoid the redundant detailed description, therefore, the same reference symbols are given to those components of the second embodiment which are the same as the corresponding components of the first embodiment.

Figure 7A:
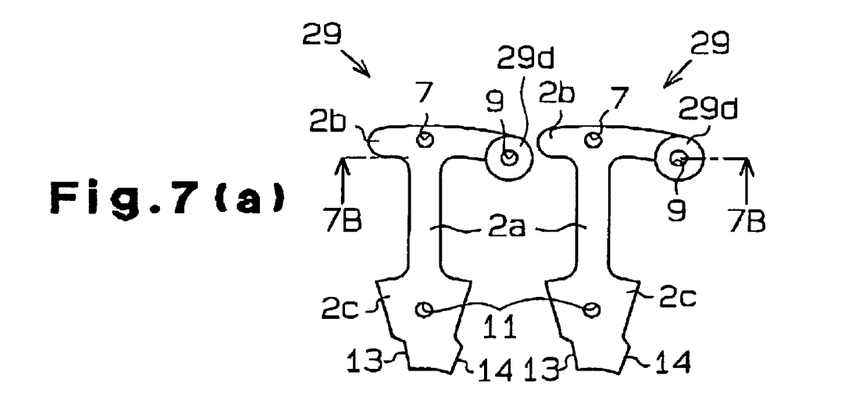
FIG. 7(a) is a plan view of first teeth according to a second embodiment of the invention.
Figure 7B:
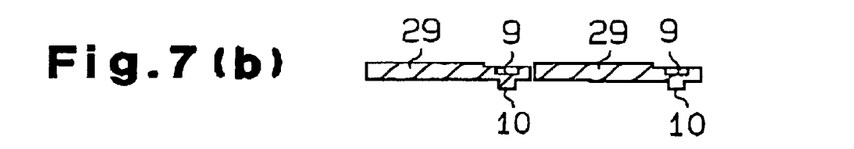
FIG. 7(b) is a cross-sectional view taken along the line 7B—7B in FIG. 7(a)

FIGS. 7(a) and 7(b) show first teeth 29 according to the second embodiment. The first tooth 29 differs from the first tooth 2 of the first embodiment in that the surface of a first coupling portion 29d is dented. In other words, the thickness of the first coupling portion 29d is smaller than thickness of a portion of each first tooth 29 which excludes the first coupling portion 29d.

Figure 7C:
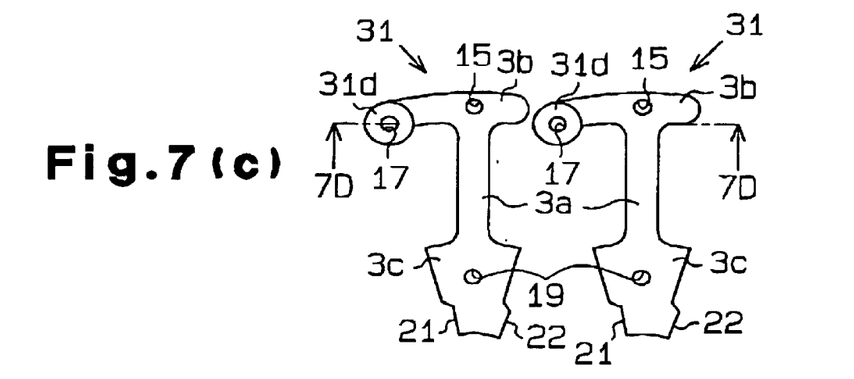
FIG. 7(c) is a plan view of second teeth according to the second embodiment of the invention.
Figure 7D:
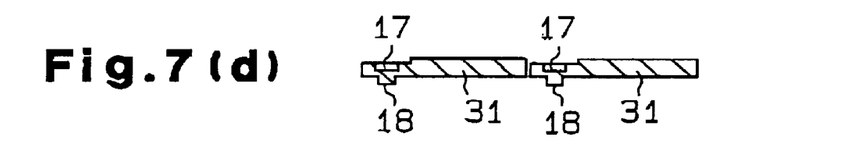
FIG. 7(d) is a cross-sectional view taken along the line 7D—7D in FIG. 7(c)

FIGS. 7(c) and 7(d) show second teeth 31 according to the second embodiment. The second tooth 31 differs from the second tooth 3 of the first embodiment in that the surface of a second coupling portion 31d is dented. In other words, the thickness of the second coupling portion 31d is smaller than thickness of a portion of each second tooth 31 which excludes the second coupling portion 31d.

Figure 7E:
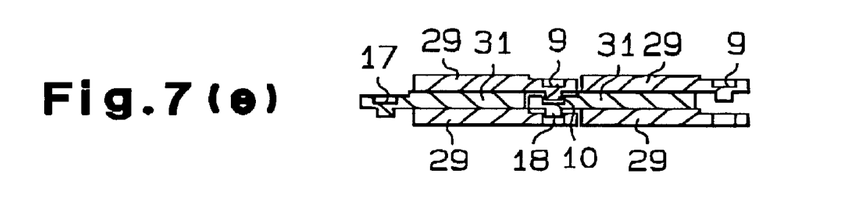
FIG. 7(e) is a cross-sectional view showing a coupled portion of a first coupling portion and a second coupling portion of a rotor core according to the second embodiment of the present invention.

As shown in FIG. 7(e), therefore, the rotor core 1 has a clearance between the first coupling portion 29d and a second coupling portion 31d which are stacked on each other.

The second embodiment has the following advantage in addition to the advantages of the first embodiment.

There is a clearance between the first coupling portion 29d and the second coupling portion 31d of the rotor core 1, which are stacked on each other. This secures a sufficient magnetic resistance in the coupled portion of the first coupling portion 29d and the second coupling portion 31d, thus making is possible to suppress the leakage of the magnetic flux.

The first and second embodiments may be modified as follows.

In the embodiments, each first tooth 2 or 29 is provided with the first fitting recesses 7 and 11 and the first fitting projections 8 and 12 as fitting portions which are fitted on the fitting portions of the stacked second teeth 3 or 31. However, the quantity of the first fitting recesses to be provided on each first tooth 2 may be one or more than two, and the quantity of the first fitting projections to be provided on each first tooth 2 may be one or more than two.

In the embodiments, each second tooth 3 or 31 is provided with the second fitting recesses 15 and 19 and the second fitting projections 16 and 20 as fitting portions which are fitted on the fitting portions of the stacked first tooth 2 or 29. However, the quantity of the second fitting recesses to be provided on each second tooth 3 may be one or more than two, and the quantity of the second fitting projections to be provided on each second tooth 3 may be one or more than two.

The first fitting recess 7 and the first fitting projection 8 of the first tooth 2 or 29 which constitute the axial-directional end portion of the rotor core 1 may be replaced with through holes. The first fitting recess 11 and the first fitting projection 12 of the first tooth 2 or 29 which constitute the axial-directional end portion of the rotor core 1 may also be replaced with separate through holes. Further, the first rotary recess 9 and the first rotary projection 10 of the first tooth 2 or 29 which constitute the axial-directional end portion of the rotor core 1 may be replaced with further different through holes. This can prevent the fitting projections or the rotary projections from protruding from the axial end portions of the rotor core 1.

Although the first core sheets 4 and the second core sheets 5 are alternately stacked one on another one at a time in the above-described embodiments, for example, the first core sheets 4 and the second core sheets 5 are alternately stacked one group on another comprising plural core sheets.

The fixing portion 2c of the first tooth 2 or 29 may be designed to be bilaterally symmetrical to the fixing portion 3c of the second tooth 3 or 31. This design can make it possible to suppress the imprudent movement of the teeth 2 and 3 or 29 and 31 in the axial direction of the rotor core 1.

Although the rotor core 1 is formed by a single coupled body 26 in the embodiments, the rotor core 1 may be formed by connecting a plurality of coupled bodies 26.

Although the top surfaces of the first coupling portion 29d and the second coupling portion 31d are dented in the second embodiment, the back surfaces of the first coupling portion 29d and the second coupling portion 31d may be dented. Alternatively, both the top and back surfaces of the first coupling portion 29d and the second coupling portion 31d may be dented.

Although the quantity of the first trims 2' included in each first trim row is set to twelve in the step of forming the first teeth 2 in the embodiments, the quantity may be set equal to or less than eleven or equal to or greater than thirteen. Although the quantity of the second trims 3' included in each second trim row is set to twelve in the step of forming the second teeth 3 in the embodiments, the quantity may be set equal to or less than eleven or equal to or greater than thirteen.

While the embodiments of the invention have been discussed in connection with the accompanying drawings, the present invention is not limited to those described above, but may be modified within the scope and equivalence of the appended claims.

What is claimed is:

1. A rotor of an electric motor comprising:
a plurality of first core sheets, wherein each of said first core sheets includes a plurality of first teeth which are laid out in a ring form on a first plane, wherein each of said first teeth has a first winding portion extending in a radial direction of said rotor and each of said first teeth has a first arm portion integrally provided at an outer end of said first winding portion in said radial direction of said rotor and extending in a peripheral direction of said rotor, and wherein each of said first arm portions has a first coupling portion at one end; and
a plurality of second core sheets, wherein each of said second core sheets includes a plurality of second teeth which are laid out in a ring form on a second plane, wherein each of said second teeth has a second winding portion extending in said radial direction of said rotor and each of said second teeth has a second arm portion integrally provided at an outer end of said second winding portion in said radial direction of said rotor and extending in said peripheral direction of said rotor, and wherein each of said second arm portions has a second coupling portion at one end,
wherein said first core sheets and said second core sheets are stacked in an axial direction of said rotor, wherein each of said first teeth is stacked on an associated one of said second teeth in said axial direction of said rotor and each of said first teeth is coupled to one of said second teeth that is stacked on another one of said first teeth adjoining in said peripheral direction of said rotor by coupling of said first and second coupling portions, and wherein a remaining portion of each arm portion which excludes the associated coupling portion is located further apart from an axis of said rotor than the associated coupling portion.

2. The rotor according to claim 1, wherein with regard to said radial direction of said rotor, a size of said portion of each arm portion is smaller than a size of said associated coupling portion.

3. The rotor according to claim 1, wherein each of said coupling portions is positioned closer to said axis of said rotor than said remaining portion of each arm portion.

4. The rotor according to claim 1, wherein one of said first and second teeth stacked on each other has a projection in a portion that is located off the associated winding portion and the other one of said first and second teeth has a recess to be fitted over said projection.

5. The rotor according to claim 1, wherein one of said first and second teeth stacked on each other has two projections, one of said projections being at a portion that is further away from the axis of said rotor than the associated winding portion and the other one of said projections being at a portion that is closer to the axis of said rotor than the associated winding portion, and the other one of said first and second teeth has recesses to be respectively fitted over said projections.

6. The rotor according to claim 1, wherein each of said teeth has a restriction portion at a position near the axis of said rotor, and the restriction portions of both teeth which are adjoining in said peripheral direction of said rotor are engaged with each other to restrict a relative movement of said both teeth in said radial direction of said rotor.

7. The rotor according to claim 1, wherein there is a clearance between said first coupling portion and said second coupling portion of said first and second teeth stacked on each other.

8. The rotor according to claim 7, wherein with regard to said axial direction of said rotor, a thickness of each said coupling portion is smaller than that of said remaining portion of each said arm portion.

9. The rotor according to claim 1, wherein one of said first and second coupling portions to be coupled together has a projection and the other one of said first and second coupling portions has a recess to engage with said projection.

10. A method for manufacturing a rotor of an electric motor, comprising the steps of:

forming a plurality of first teeth and a plurality of second teeth by punching a metal plate, each tooth having a winding portion extending in one direction and an arm portion which is integrally provided at a distal end of said winding portion, said arm portion extending in a direction nearly perpendicular to said winding portion and having a coupling portion at one end, a remaining portion of each arm portion which excludes the associated coupling portion being located further apart from a proximal end of the associated winding portion than the associated coupling portion;

forming a plurality of laminated bodies by stacking said first teeth and said second teeth in such a way that said coupling portions of said first teeth and said coupling portions of said second teeth in each laminated body face in opposite directions;

forming a coupled body comprised of a plurality of laminated bodies by coupling said coupling portions of said first teeth in one of adjoining two laminated bodies to said coupling portions of said second teeth in the other one of said adjoining two laminated bodies in a rotatable manner, said laminated bodies being laid out in a line in such a way that said winding portions in each laminated body become nearly parallel to said winding portions in another laminated body;

winding a winding in said winding portions on each laminated body; and rotating adjoining two laminated bodies in such a way that said coupled body forms a ring-like shape and said winding portions are arranged radially.

11. The method according to claim 10, wherein when said metal plate is punched, fitting portions are formed in portions of said first and second teeth which do not constitute said winding portions, and wherein, when each laminated body is formed, said fitting portions of said first and second teeth stacked on each other are fitted together.

12. The method according to claim 11, wherein in each tooth, said fitting portions are formed in a portion that is closer to a distal end of the tooth than the associated winding portion and in a portion that is closer to a proximal end of the tooth than the associated winding portion.

13. The method according to claim 10, wherein when said metal plate is punched, a restriction portion is formed at a proximal end of each tooth and when said coupled body forms a ring-like shape, said restriction portion of each of said teeth in each laminated body is engaged with said restriction portion of one of said teeth in an adjoining laminated body, thereby restricting a relative movement of said both adjoining laminated bodies in said radial direction of said rotor.

* * * * *